Nov. 3, 1936.   R. W. CARLSON   2,059,549
ELECTRIC PRESSURE METER
Filed Oct. 16, 1933
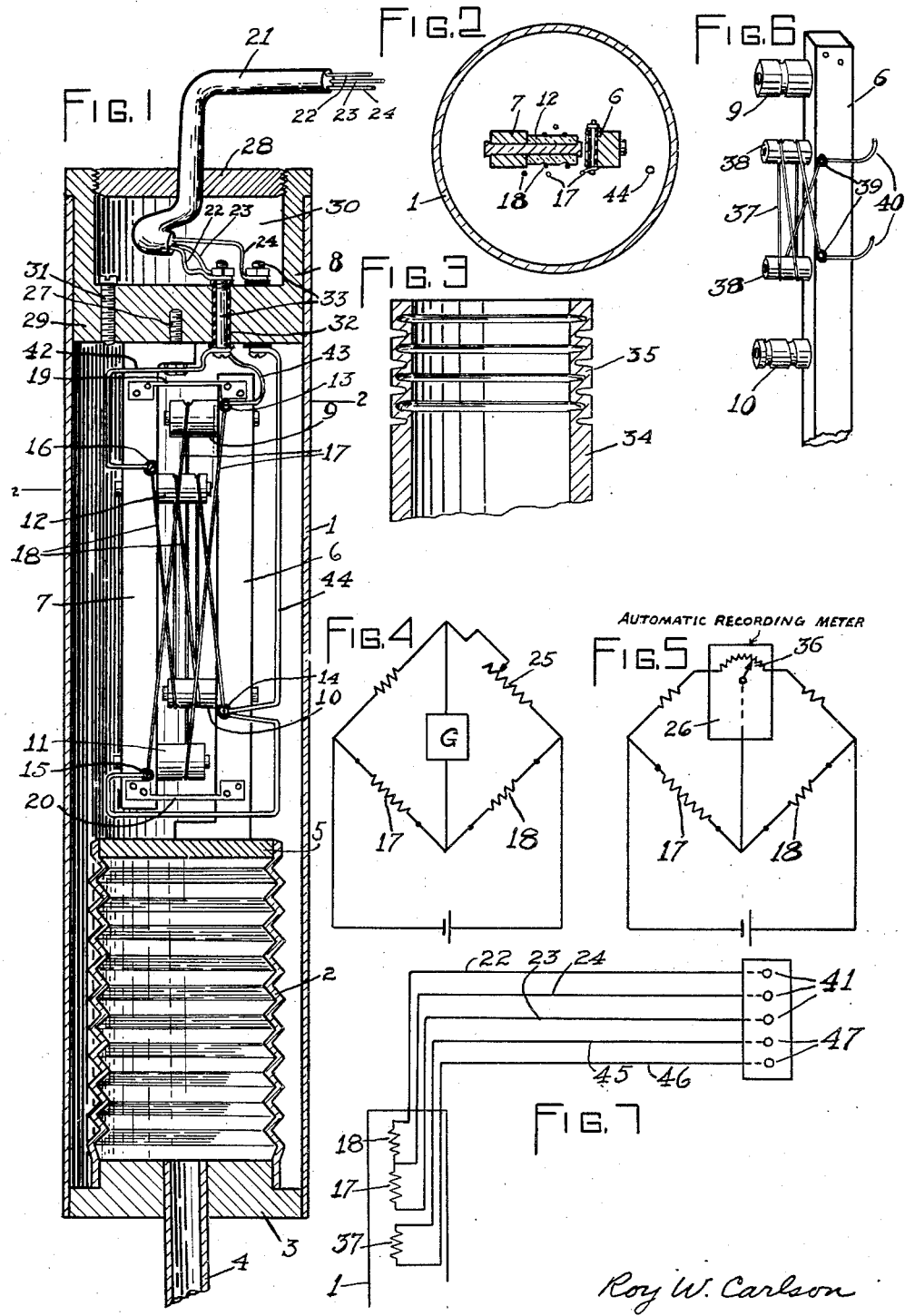
Roy W. Carlson
INVENTOR Patented Nov. 3, 1936

2,059,549

UNITED STATES PATENT OFFICE 2,059,549

ELECTRIC PRESSURE METER

Roy W. Carlson, Berkeley, Calif.

Application October 16, 1933, Serial No. 693,761

5 Claims. (Cl. 177—351)

This invention relates to pressure measuring devices and more particularly to meters for indicating fluid pressures at places more or less remote from the points where the pressures exist.

The invention provides for determining pressures by the use of electrical measuring equipment whereby great accuracy and extremely convenient operation is achieved.

According to a preferred form of the invention a pressure responsive device, which may be enclosed in a sealed case, may be situated at the point where the pressure exists and be connected by conductors with any form of electrical resistance measuring equipment at any other place. The invention thereby is of especially great convenience where the pressures to be determined are in inaccessible locations.

The pressure responsive device may preferably comprise an element affected by pressure, such as a bellows, for example, and one or more resistance elements stressed by the pressure responsive element. The resistance elements may be connected in the circuit of the remotely situated resistance measuring equipment.

The pressure meter may be used for all types of pressure measurements and may also be used for measuring the depths of fluids in reservoirs or tanks, in which case the pressure device is preferably situated near the bottom of the reservoir, the pressure reading obtained indicating the depth. By the use of applicant's invention in large water reservoirs, for example, expensive and inconvenient float wells and float mechanisms may be dispensed with.

While certain specific arrangements will be described herein I intend the invention to cover such variations and modifications as the art will permit. Although certain parts will be given specific names for convenience equivalent parts might equally be referred to without departing from the invention.

The invention will be understood from the following description together with the accompanying figures of the drawing in which the invention is illustrated and in which Figure 1 is a sectional elevation of a pressure meter containing an embodiment of my invention;

Figure 2 is a section on the line 2—2 of Figure 1;

Figure 3 illustrates one method of forming a bellows;

Figure 4 shows a manually adjusted Wheatstone bridge circuit for use with said meter in measuring pressures;

Figure 5 shows a Wheatstone bridge circuit including a recording meter for automatically recording the pressures measured by the pressure meter;

Figure 6 shows a part of the meter structure of a modified form of the invention; and Figure 7 shows a circuit including the modified meter.

The meter, Figures 1 and 2, comprises a cylindrical case 1 containing a bellows 2. The bellows is preferably made of metal, such as high elastic steel, and may be made, for example, by rolling a cylindrical tube with complementary interior and exterior corrugated rollers or by cutting alternate interior and exterior grooves in a cylindrical tube of sufficient thickness. If the rolling process is used the metal may be hardened thereby or it may be hardened by any well known method afterward, if desired.

The second method is indicated in Figure 3. This figure shows a thick walled tube in section with an uncut portion 34 and a portion 35 cut with the desired grooves to form the bellows. In the carrying out of the invention bellows of other shapes may be used.

The lower end of the bellows 2 is secured and sealed at its circumference to the cover 3 which closes and seals the lower end of cylinder 1. The interior of the bellows communicates with the fluid whose pressure is to be determined by means of a tube 4 which penetrates the cover 3. The upper end of the bellows is closed by a flat top 5 parallel with the cover 3.

A rigid bar 6 of metal such as steel and of rectangular cross-section is firmly secured at one end to the top 5 and extends upward within the cylindrical case 1 parallel to the axes of the case and the bellows 2, its length being less than the distance to cover 8 closing the upper end of case 1. Bar 6 may be fastened to the top 5 by a welded joint or by any other suitable method. A similar bar 7 is firmly secured to bottom 29 of indented cover 8 by screw 27 and extends down from said cover parallel with bar 6 for a distance less than that to the top 5 of the bellows. Bars 6 and 7 are so spaced on opposite sides of the axis of the case that their interior faces are parallel and opposite to each other and are separated a distance sufficient to allow clearance for spools 9 and 10 and 11 and 12 attached, respectively, to bars 6 and 7.

Spacing members 19 and 20, consisting of flat metal springs having enlarged ends whereby they may be secured to the bars 6 and 7 are connected between the two bars near their upper and lower ends. The planes of the springs are normally perpendicular to the length of the bars. Thus they allow the bars a limited relative movement lengthwise due to their elasticity but effectively prevent relative movement of the bars in any other manner.

Spools, or blocks, 9 and 10 are made of insulating material, such as porcelain or glass, for example, and are firmly attached to the inner face of bar 6 with their axes perpendicular thereto. Spool 9 is attached to the upper end of bar 6 and spool 10, which is of smaller diameter than spool 9 is attached at a distance below it. Spools 11 and 12, similar, respectively, to spools 9 and 10 are attached to the inner face of bar 7 in like manner, spool 11 being attached to the lower end of bar 7 below spool 10 a sufficient distance to allow clearance with it. Spool 12 is attached to bar 7 at a point just below spool 9 and preferably a greater distance above spool 10. Thus spools 9, 12, 10, and 11, from top to bottom, are alternately attached to bars 6 and 7 with the two larger spools in the extreme upper and lower positions and the two smaller spools between them.

A machine screw 13 projects from the front surface of bar 6 near spool 9 and is insulated from the bar. Similarly a screw 14 is attached to bar 6 near spool 10 and screws 15 and 16 are attached to bar 7 near spools 11 and 12, respectively. A small wire or conducting filament 17 is attached by one end to screw 13 and is looped around insulator spools 11 and 9, the opposite end being connected to screw 15. Although, for simplicity, the wire is shown making only one loop about the two spools it may pass back and forth from one to the other several times and grooves may be provided in the spools to keep successive turns separated. The wire is normally maintained under tension. Tension may be applied during assembly by attaching one end of the wire to one of the screws, looping it over the spools, hanging a weight of proper size from the other end and after adjusting all strands to equal tension finally fastening the free end to the other screw. A wire 18, in a similar manner, is looped about the smaller insulator spools 10 and 12 under tension and is attached at its ends to screws 14 and 16.

Since spools 10 and 12 are smaller than 9 and 11 the two coils do not interfere or make contact with each other. They are, however, so close to each other that any external temperature variations will ordinarily affect them both to the same extent. In addition, the metals forming the parts of the entire meter may be chosen with such temperature expansion coefficients that changes in dimensions in any part will be compensated for in the other parts and the temperature variations will not affect the tension of the coils 17 and 18. It is desirable that the dimensions of the pressure meter be so proportioned and the number of turns of the two coils be so related that approximately the same length of wire is on each coil. This is not an essential requirement to the successful operation of the meter, however.

Cover 8 is indented to form a depression into which a flat circular cap 28 screws thus forming a chamber 30 within the cover. The bottom 29 of the chamber 30 is penetrated by an oil filling hole into which is threaded a tight-fitting machine screw 31. Three other holes penetrate bottom 29 and are lined with insulation 32. Three bolts 33 pass through these holes and are insulated from the cover and case by insulation 32. Only two bolts are shown in Figure 1 the third being behind one of the others.

An insulated lead-in cable 21 comprising three conductors 22, 23, and 24 enters chamber 30 through a hole in cap 28. Three conductors 42, 43 and 44 are connected to the ends of the bolts 33 which are within the case and the conductors 22, 23 and 24 are connected, respectively, to the ends of the bolts 33 which are within the chamber. Conductor 42 is connected to the upper terminal of coil 18, conductor 43 to the upper terminal of coil 17 and conductor 44 to the lower terminals of both coils. These last connections are preferably made by soldering or otherwise connecting the wires 42, 43 and 44 to the terminating screws 13, 14, 15, and 16.

It is desirable, in order to avoid sulfur corrosion, to expose no rubber surface within the case. My arrangement allows covered lead-in cable 21 to be terminated outside the main portion of the case so that such corrosion will be avoided. The insulation of wires 42, 43 and 44 should be of enamel or some other non-sulfur bearing material.

After assembly the case 1 is filled with a hot non-conducting liquid such as an insulating oil of which mineral oil is an example. Screw 31 is then screwed into the oil filling hole. A melted or softened sealing compound is then poured into the depression 30 in cover 8 and cap 28 is screwed on. As the hot oil (or other liquid) in the main part of the case cools a small vacuous space is left within the case which allows for volume variations due to expansion of bellows 2.

The operation of the meter is as follows:

The pressure of the fluid to be measured exerts an expanding force on the bellows 2, which force varies with the pressure. Expansion of the bellows responsive to an increase in pressure will raise bar 6 relative to bar 7 and, according to my invention, apply a greater tension to coil 17 while reducing the tension on coil 18. On the other hand a decrease in pressure will reduce the tension on the strands of coil 17 and increase the tension on those of coil 18. Since the elastic stiffness of the meter is high the change in volume of the bellows will be extremely small and hence the effect of the gauge on the system being measured is small.

The effect of changing the tension on the wires in the coils 17 and 18 is to vary their resistances to electric current, the resistance of either coil increasing with increased tension and decreasing with decreased tension. When the bellows expands, therefore, coil 17 will increase in resistance and coil 18 will decrease in resistance. Thus by connecting coils 17 and 18 in two arms of a Wheatstone bridge circuit such as that shown in Figure 4 by the conductors 22, 23 and 24 the relative resistances of the two coils may be determined by balancing the bridge and reading the final magnitude of variable resistance 25.

The meter may be calibrated in the same manner as other forms of pressure gauges, that is by applying a fluid under pressure from a pressure pump and measuring simultaneously the pressure on the fluid by means of a dead weight calibration device and the relative resistances of the two coils of the pressure meter. This is repeated for various pressures until the relation between the pressure and the relative resistances of the coils 17 and 18 are known for the entire range over which the meter is to be used.

The Wheatstone bridge shown in Figure 5 is arranged for use with an especially adapted automatic recording meter 26 of well known type, such as is used in a temperature difference recorder. Meter 26 comprises a sliding contact mechanism for controlling sliding contact 36 in the bridge circuit to keep the bridge in balance at all times. The mechanism also makes a record on a moving graph of the position of the sliding contact. The graph, with proper calibration will then also be a continuous record of the relative resistances of the two coils 17 and 18.

Figure 6 shows a portion of the structure of a pressure meter arranged according to a modified form of my invention. In this embodiment a third wire or filament 37 is wound over a pair of spools or pegs 38 mounted on bar 6 and the ends of the coil are secured to insulated screws 39 in the bar. The spools 38 are so positioned that when the meter is completely assembled the spools 38 will both be between spools 10 and 12 on the two bars 6 and 7. Coil 37 is thus maintained at constant tension and is mounted within the two variable tension coils 17 and 18 out of contact with them. Lead-in conductors 40 connect coil 37 with two extra conductors in insulated cable 21 in a manner similar to the connections of wires 42, 43 and 44 with conductors 22, 23, and 24.

Figure 7 shows the circuit connections of the coils. Conductors 22, 23, and 24 connect the variable tension coils 17 and 18 with binding posts 41 by means of which they may be connected into any standard resistance measuring circuit such as the Wheatstone bridge circuits shown in Figures 4 and 5. Conductors 45 and 46, which connect with conductors 40 within the meter case, connect constant resistance coil 37 to the binding posts 41. By this arrangement coil 37 may be connected into a bridge circuit in place of either other coil and may then be balanced against the remaining variable tension coil. Coil 37 may also be measured alone to check the condition of the meter. It may be used as a resistance thermometer, for example, to measure the temperature of the coils. It may also be used as a standard against which the resistances of the other two coils may be compared.

As an example of what may be done in practice it has been found satisfactory in a structure similar to Figure 1 to use high carbon steel music wire of three to seven thousandths of an inch in diameter for the coils 17 and 18 and to make coil 17 seven strands in length and coil 18 nine strands in length. The outer spools 9 and 11 have in some cases been separated two and one-half inches and the inner spools 10 and 12 have been separated one and three-fourths inches. Wide variations in the above dimensions may be made, however.

Applicant has produced a pressure meter which may replace the usual forms of pressure gauges and provide remote reading, either manually or automatically. The meter is a compact, self-enclosed unit, practically fool-proof in operation and very simple in use. If desired it may be completely immersed in the fluid to be measured. In measuring the pressures of water in reservoirs whereby the depth may be determined the pressure responsive meter may, if desired, be laid on the bottom of the reservoir with the lead cable connecting to the electrical equipment at the surface.

Although certain specific embodiments of the invention have been shown and described herein I do not wish to be limited thereby but desire to cover broadly all variations thereof which come within the spirit and scope of the appended claims.

What is claimed is:

1. A fluid pressure measuring device comprising in combination, a first base, an elastic bellows attached by one end to said base, a tube connecting the inside of the bellows with the fluid pressure to be measured, a closure for the free end of said bellows, a rod attached thereto and extending parallel to the axis of the bellows, a second base in spaced relation to said first base, a second rod parallel to the first rod supported on said second base, a first and a second spool on each of said rods, a first wire coil encircling both the first of said spools, a second wire coil encircling both the second of said spools and means to apply an initial tension to said wires whereby relative linear movement of said rods will increase the tension of the wire in one coil and decrease the tension of the wire in the other coil and a casing extending between said bases and surrounding said bellows and rod assemblies.

2. A fluid pressure measuring device comprising a case, a fluid pressure responsive bellows therein, means connecting said bellows with the source of fluid pressure to be measured, a first pair of strand supporting means in said case, a first strand of electrically conductive material strung between said pair of supporting means to connect them, a second pair of strand supporting means in said case, a second strand of electrically conductive material strung between said second pair of supporting means to connect said second pair of means, means to apply an initial tension to both said strands, and means responsive to the expansion of said bellows to increase the tension of said first strand and responsive to the contraction of said bellows to increase the tension of said second strand, whereby changes in the size of said bellows will cause changes in the electrical conductivity of said strands.

3. A pressure measuring device comprising a hollow cylindrical case, a bellows mounted within said case and having a pressure movable wall separating at least a part of the interior of said case from the exterior thereof, said wall being substantially perpendicular to the axis of said case, a pair of overlapping bars parallel to the axis of said case, the first of said bars being secured to said movable wall and the second of said bars being secured to said case, means on each of said bars arranged to have one side of a coil looped around it, a coil of electrical conducting material looped around said last mentioned means on the two bars with the axis of said coil substantially perpendicular to the axis of said case and with said coil loop arranged to resist movement of said wall responsive to a change in external fluid pressure, means for placing an initial tension upon said coil, each strand of said coil being equally stressed.

4. A pressure measuring device comprising a hollow cylindrical case, a bellows mounted within said case and having a pressure movable wall separating at least a part of the interior of said case from the exterior thereof, said wall being substantially perpendicular to the axis of said case, a pair of overlapping bars parallel to the axis of said case, the first of said bars being secured to said movable wall and the second of said bars being secured to said case, means on each of said bars adapted to have one side of each of two coils looped around it, a pair of coils of electrical conducting material each looped around said last mentioned means on the two bars with the axes of said coils substantially perpendicular to the axis of said case, with the first of said coils arranged so as to resist movement of said wall responsive to an increase in external fluid pressure and the second of said coils arranged so as to resist movement of said wall responsive to a decrease in external fluid pressure, said coils placing an initial tension upon each other, each strand of said coils being substantially equally stressed with the other strands of its respective coil.

5. A fluid pressure measuring device comprising a cylindrical tube, a partition closing said tube, said partition having a central area substantially perpendicular to the axis of said tube and a flexible portion surrounding said central area so as to permit limited axial movement thereof responsive to a differential of pressure on the opposite sides of said partition, a closure for said tube spaced from said partition, a pair of overlapping bars in said tube between said partition and said closure and substantially parallel to the axis thereof, one of said bars being secured to the central area of said partition, the other being secured to said closure, a variable tension wire resistance element secured between said bars so as to have its tension varied by relative motion of said bars, and means for applying the fluid pressure to be measured to one side of said partition.

ROY W. CARLSON.